(12) United States Patent
Lee et al.

(10) Patent No.: US 9,179,052 B2
(45) Date of Patent: Nov. 3, 2015

(54) CAMERA MODULE

(71) Applicant: SAMSUNG ELECTRO-MECHANICS CO., LTD., Suwon-si (KR)

(72) Inventors: Sang Jin Lee, Suwon-si (KR); Ick Chan Shim, Suwon-si (KR); Hong Sik Yang, Suwon-si (KR); Kum Sung Jang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/587,096

(22) Filed: Dec. 31, 2014

(65) Prior Publication Data

US 2015/0109526 A1    Apr. 23, 2015

Related U.S. Application Data

(63) Continuation-in-part of application No. 13/427,817, filed on Mar. 22, 2012.

(30) Foreign Application Priority Data

Sep. 23, 2011  (KR) .................. 10-2011-0096273

(51) Int. Cl.
H04N 5/225  (2006.01)
(52) U.S. Cl.
CPC ........... *H04N 5/2252* (2013.01); *H04N 5/2253* (2013.01); *H04N 5/2254* (2013.01); *H04N 5/2257* (2013.01)
(58) Field of Classification Search
None
See application file for complete search history.

(56) References Cited

U.S. PATENT DOCUMENTS

| 2006/0132598 | A1* | 6/2006 | Minami et al. | 348/76 |
| 2008/0239525 | A1* | 10/2008 | Chan | 359/829 |
| 2008/0273111 | A1* | 11/2008 | Gustavsson et al. | 348/340 |
| 2010/0158508 | A1* | 6/2010 | Kim | 396/529 |
| 2010/0328525 | A1 | 12/2010 | Lee et al. | |
| 2011/0063493 | A1* | 3/2011 | Lee | 348/345 |
| 2013/0076976 | A1 | 3/2013 | Lee et al. | |

FOREIGN PATENT DOCUMENTS

| KR | 1020100102827 A | 9/2010 |
| KR | 1020110000952 A | 1/2011 |

OTHER PUBLICATIONS

Office Action mailed Oct. 12, 2012, from counterpart Korean Patent Application No. 10-2011-0096273, 6 pages, english summary included.

* cited by examiner

*Primary Examiner* — Albert Cutler
(74) *Attorney, Agent, or Firm* — NSIP Law

(57) ABSTRACT

Embodiments of the invention provide a camera module including a lens barrel part in which a plurality of lenses are stacked, a housing having the lens barrel part disposed therein, and an infrared (IR)-cut filter provided in the housing and disposed at a lower portion of the lens barrel part. According to at least one embodiment, the camera module further includes a circuit board having a window formed therein so as to penetrate through a central region thereof and supporting a bottom surface of the housing; an image sensor accommodated in the window of the circuit board and converting an external image into an electrical signal, and a plate coupled to a lower portion of the circuit board to radiate heat generated from the circuit board.

19 Claims, 10 Drawing Sheets

CAMERA MODULE

CROSS REFERENCE TO RELATED APPLICATION

This application is a continuation-in-part of and claims the benefit to U.S. patent application Ser. No. 13/427,817, entitled "CAMERA MODULE," filed on Mar. 22, 2012, which claims the benefit of and priority under 35 U.S.C. §119 to 35 U.S.C. §119 to Korean Patent Application No. KR 10-2011-0096273, entitled "CAMERA MODULE," filed on Sep. 23, 2011, which are hereby incorporated by reference in their entirety into this application.

BACKGROUND

1. Field of the Invention

The present invention relates to a camera module, and more particularly, to implementation of a slim camera module.

2. Description of the Related Art

As a mobile phone or a tablet personal computer (PC) has gradually become slim, a camera module has become slim. In this situation, there are some limitations in products that may be implemented by a component according to the conventional art.

In order to manufacture a slim camera module under the same condition, a special package technology is required, which may be considered as a technology and market competitiveness of a company.

The camera module according to the conventional art has been manufactured in a chip of board (COB) scheme that is currently implemented in many companies. Thus, the camera module is configured to include, for example, a lens, a housing, a filter, a sensor, or a circuit board, as non-limiting examples.

This scheme has a limitation in implementing slimness of the camera module. Therefore, research into a structure for slimness of a camera module has been urgently demanded.

SUMMARY

Accordingly, embodiments of the invention have been made to provide a camera module capable of having a slim size and securing reliability.

According to an embodiment of the invention, there is provided a camera module, which includes a lens barrel part in which a plurality of lenses are stacked, a housing having the lens barrel part disposed therein, an infrared (IR)-cut filter provided in the housing and disposed at a lower portion of the lens barrel part to remove near infrared wavelengths, a circuit board having a window formed therein so as to penetrate through a central region thereof and supporting a bottom surface of the housing; an image sensor accommodated in the window of the circuit board and converting an external image into an electrical signal, and a plate closely adhered and coupled to a lower portion of the circuit board to radiate heat generated from the circuit board.

According to at least one embodiment, the circuit board has a thickness corresponding to that of the image sensor.

According to at least one embodiment, the camera module further includes a wire bonding part electrically connecting the image sensor and the circuit board to each other.

According to at least one embodiment, the plate has a thickness thinner than that of the circuit board.

According to at least one embodiment, the plate is made of a steel or copper material.

According to at least one embodiment, the plate is made of a thermal conductive material.

According to at least one embodiment, an upper surface of the circuit board is disposed on the same plane as an upper surface of the image sensor.

According to at least one embodiment, at least a portion of the housing directly contacts the plate.

Various objects, advantages and features of the invention will become apparent from the following description of embodiments with reference to the accompanying drawings.

BRIEF DESCRIPTION OF DRAWINGS

These and other features, aspects, and advantages of the invention are better understood with regard to the following Detailed Description, appended Claims, and accompanying Figures. It is to be noted, however, that the Figures illustrate only various embodiments of the invention and are therefore not to be considered limiting of the invention's scope as it may include other effective embodiments as well.

DETAILED DESCRIPTION

Figure 1:
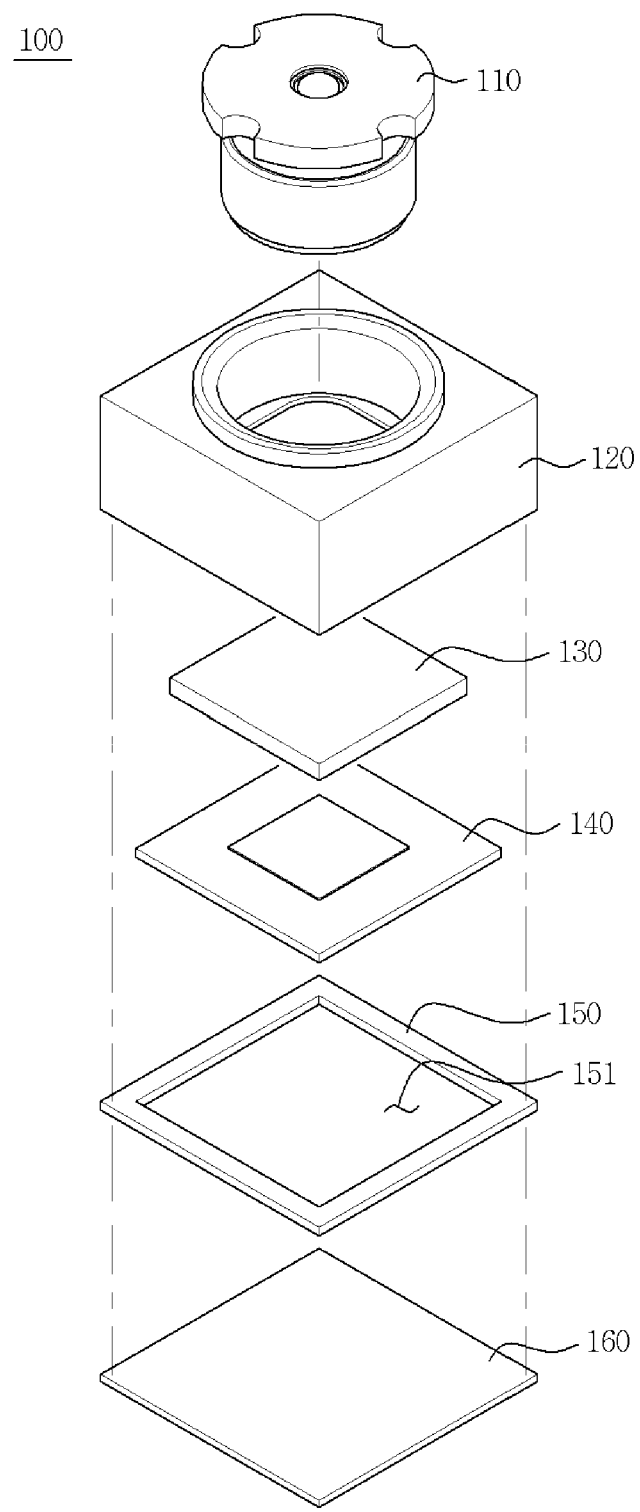
FIG. 1 is an exploded perspective view of a camera module according to a first embodiment of the invention.

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

Hereinafter, various embodiments of the present invention will be described in detail with reference to the accompanying drawings.

Figure 2:
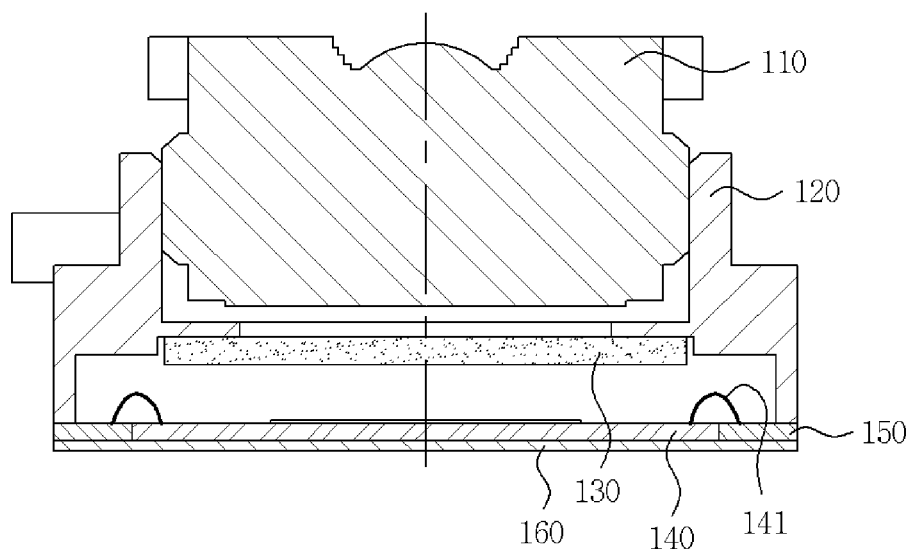
FIG. 2 is a cross-sectional view of the camera module according to the first embodiment of the invention.

FIG. 1 is an exploded perspective view of a camera module 100 according to a first embodiment of the invention; and FIG. 2 is a cross-sectional view of the camera module 100 according to the first embodiment of the invention.

As shown in FIG. 1, the camera module 100 according to the first embodiment of the invention, which may have a small and slim size and secure reliability against drops, for example, is configured to include a lens barrel part 110, a housing 120, an infrared (IR)-cut filter 130, an image sensor 140, a circuit board 150, and a plate 160.

According to at least one embodiment, the lens barrel part 110 is configured of a plurality of lens embedded therein, collects images of a subject for photography on the image sensor 140 in the camera module 100, and is screw-coupled to the housing 120 by a screw thread formed on an outer peripheral surface thereof.

According to at least one embodiment, the housing 120 supports the entire lens barrel part 110 to protect the lens barrel part 110 from the outside and is fixedly coupled to the circuit board 150 to protect components such as the IR-cut filter 130 mounted on the circuit board 150.

According to at least one embodiment, an inner peripheral surface of the housing 120 to which the lens barrel part 110 is coupled is provided with a screw groove engaged with the screw thread of the lens barrel part 110.

According to at least one embodiment, the IR-cut filter 130 is required in order to remove wavelengths in a near infrared range. More specifically, a camera of a camera phone generates an image by converting optical signals into electric signals using a charged coupled device (CCD) or a complementary metal oxide semiconductor (CMOS). These optical signals are sensed in a near infrared region (~1150 nm) as well as in a visible region (400 to 700 nm) that are viewed by an eye of a person, such that a sensor is saturated with signals unrelated to an actual color or image. Therefore, the IR-cut filter is required to remove the wavelengths in a near infrared range.

According to at least one embodiment, the image sensor 140 converts external images into electrical signals and stores the converted electrical signals therein, instead of the existing film. According to at least one embodiment, the image sensor is divided into a charged coupled device (CCD) image sensor and a CMOS image sensor (CIS). The CCD image sensor uses a charge coupled device. In addition, the CIS uses a complementary metal oxide semiconductor.

According to at least one embodiment, the CCD image sensor directly transmits a signal in an electron form, and the CIS transfers a signal in a voltage form. When the signal is transferred in the voltage form, the possibility that noise generated during a process of transferring the voltage signal or introduced from the outside will be mixed with the voltage signal to be introduced thereinto is high. Therefore, the CCD image sensor using the electron signal is more robust to noise as compared to the CIS.

According to at least one embodiment, a ratio of an area occupied by a light receiving part in an area of one pixel is called a fill factor. Since a large amount of light may be received with respect to the same incident light as an area of the light receiving part becomes large, when the area of the light receiving part increases, the number of generated electrons also increases.

Thus, the number of electronics used as the signal increases, such that sensitivity is improved and a magnitude of the signal becomes larger than noise, thereby being robust to the noise. Since the CIS includes a circuit for converting the electron into the voltage in a pixel, it has a fill factor lower than that of CCD image sensor. This indicates that the CCD image sensor is more excellent than the CIS in view of an image quality.

According to at least one embodiment, the CCD image sensor has a fill factor higher than that of the CIS and uses the electron as the signal to be robust to the noise. However, in the CCD image sensor, since a CMOS process that is currently mainly used may not be used and surrounding circuit parts may not be implemented on a chip, a manufacturing cost is increased and integration is decreased. In addition, the CCD image sensor uses a plurality of voltages, thereby consuming a large amount of power. On the other hand, the CIS drives the circuit using a single voltage and uses the CMOS, thereby making it possible to reduce power consumption.

According to at least one embodiment, the circuit board 150 is mounted at a lower portion of the housing 120 and includes an electrical circuit or various passive elements and integration circuits mounted thereon in order to transceive electrical signals.

According to at least one embodiment, the circuit board 150 includes a window 151 formed in a central region thereof so as to penetrate through the central region, wherein the window 151 includes the image sensor 140 mounted therein. According to the conventional art, the image sensor 140 is mounted on the circuit board 150. However, according to at least one embodiment of the invention, the image sensor 140 is mounted in the window 151 formed at the center of the circuit board 150, such that the entire height of the camera module is reduced.

Thus, since a total track length (TTL) (a distance from an upper end of the lens barrel part to an upper end of the image sensor) determining the entire height of the camera module is constant according to a pixel and a kind of camera, a scheme of reducing a length of the camera module without having an effect on the TTL is required.

Since the entire length of the camera module may be reduced when the length from an upper end of the image sensor 140 to a lower end of the circuit board 150 is reduced, the image sensor 140 is mounted in the window 151 formed in the central region of the circuit board 150, thereby making it possible to significantly contribute to reducing the entire length of the camera module.

In addition, the circuit board 150 used in at least one embodiment of the invention has a thickness reduced by about 0.2 mm as compared to the ceramic substrate according to the conventional art. Thus, the circuit board 150 has a thickness of 0.2 mm, which corresponds to a general thickness of the image sensor 140.

For example, when it is assumed that TTL is 3.25 mm, the image sensor of the camera module according to the conventional art has a thickness of 0.2 mm and the circuit board thereof has a thickness of 0.4 mm. Therefore, the camera module according to the conventional art has a total height of 3.85 mm. Meanwhile, in the camera module according to at least one embodiment of the invention, a TTL is 3.25 mm, which is the same as the TTL of the camera module according to the conventional art. In addition, the image sensor 140 is mounted in the circuit board 150, such that a total thickness of the image sensor 140 and the circuit board 150 is 0.2 mm, which is the same as the thickness of the image sensor of the camera module according to the conventional art. Further, the plate 160 mounted on a lower portion of the circuit board 150 has a thickness of 0.1 mm. Therefore, the camera module according to at least one embodiment of the invention has a total height of 3.55 mm.

Therefore, the total height of the camera module according to at least one embodiment of the invention is reduced by 0.3 mm as compared to the total height of the camera module according to the conventional art.

According to at least one embodiment, the plate 160, which is mounted on the lower portion of the circuit board 150, is fixed to the lower portion of the circuit board 150 to fix the image sensor 140 simultaneously with complementing strength of the circuit board 150.

Thus, the plate complements the strength of the circuit board 150 having the strength reduced due to the thickness reduced as compared to the camera module according to the conventional art as described above, thereby making it possible to contribute to reducing the thickness of the camera module.

In addition, since the plate 160 is mounted on the lower portion of the circuit board 150 and is robust to drops, impacts, for example, reliability is secured.

Meanwhile, the circuit board 150 mounted on an upper portion of the plate 160 generates heat while transceiving electrical signals. However, the plate 160 is made of a material having excellent thermal conductivity, thereby making it possible to excellently radiate the heat generated from the circuit board 150.

According to at least one embodiment, the plate 160 is made of any material having excellent thermal conductivity and preferably, be made of a steel or copper material.

As shown in FIG. 2, the camera module 100 according to the first embodiment of the invention has a shape in which the image sensor 140 is mounted in the window formed in the central region of the circuit board 150 and the plate is mounted on the lower portion of the circuit board 150.

According to at least one embodiment, the image sensor 140 and the circuit board 150 are connected to each other by a wire bonding part 141. Since upper surfaces of the image sensor 140 and the circuit board 150 are disposed on the same plane (or level), so that upper portions of the image sensor 140 and the circuit board 150 have the same height, the wire bonding part 141 has a length reduced as compared to the conventional art.

Therefore, a raw material cost is reduced as compared to the conventional art. In addition, the wire bonding part 141 is connected laterally, such that a space may be usefully used as compared to the conventional art.

As described above, in the camera module 100 according to various embodiments of the invention, the window 151 is formed at the center of the circuit board 150, the image sensor 140 is mounted in the window 151, the height of the camera module is reduced by the thickness of the circuit board 150, and the plate 160 is mounted on the lower portion of the circuit board 150 in order to complement the strength of the circuit board 150.

Through the above-mentioned structure, the plate 160 is mounted on the lower portion of the circuit board 150 and is robust to drops, impacts, or the like, thereby reducing a thickness of the camera module simultaneously with securing the reliability of the camera module. Therefore, it is possible to miniaturize the camera module.

In addition, the plate 160 is made of a thermal conductive material, thereby making it possible to excellently radiate heat generated when the circuit board 150 mounted on the upper portion of the plate 160 transceives the electrical signals.

According to at least one embodiment, the plate 160 is mounted on the lower portion of the camera module to treat electromagnetic interface (EMI), thereby making it possible to increase reliability of the camera module.

In addition, the image sensor 140 and the circuit board 150 are connected to each other by the wire bonding part 141. Since upper portions of the image sensor 140 and the circuit board 150 have the same height, the wire bonding part 141 has a length reduced as compared to the conventional art.

Therefore, a raw material cost is reduced as compared to the conventional art. In addition, the wire bonding part 141 is connected laterally, such that a space may be usefully used as compared to the conventional art.

Figure 3:
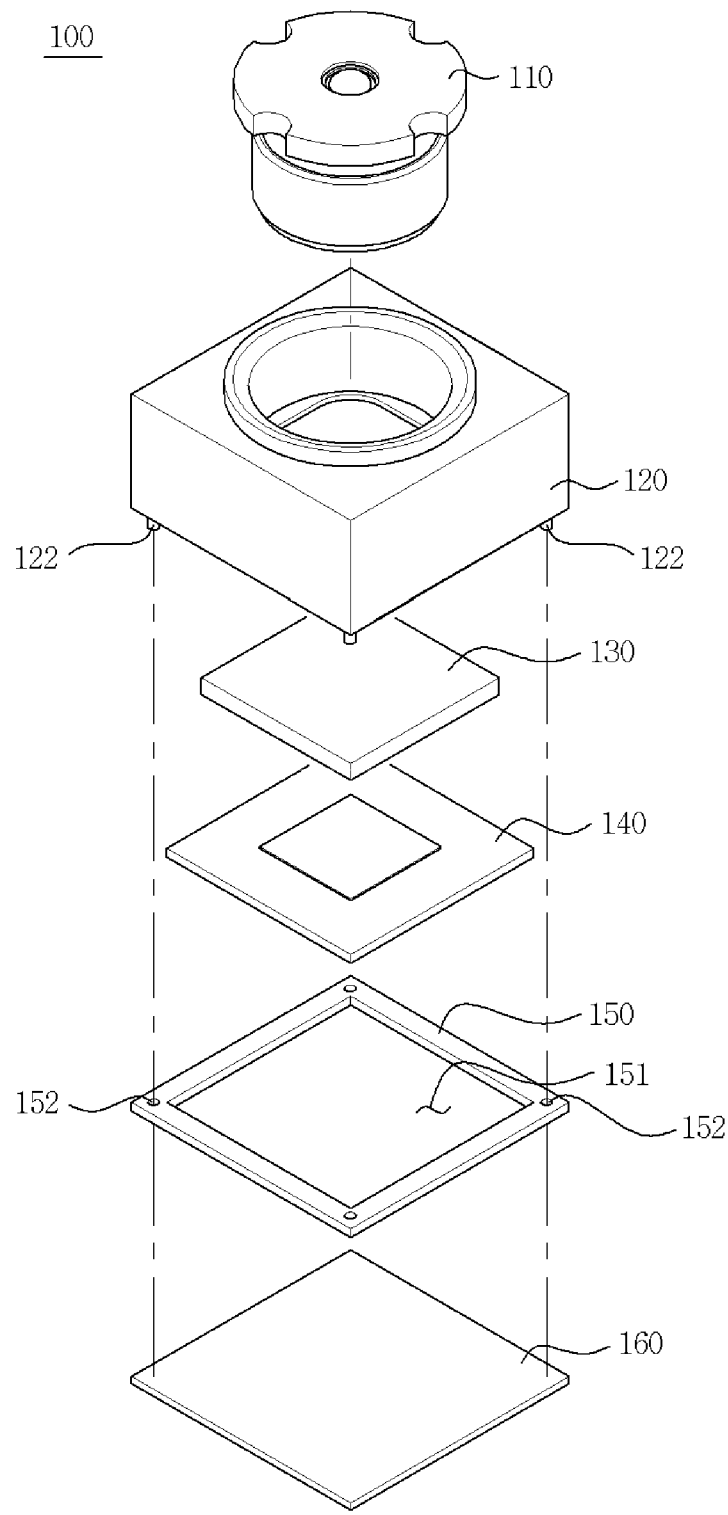
FIG. 3 is an exploded perspective view of a camera module according to a second embodiment of the invention.
Figure 4:
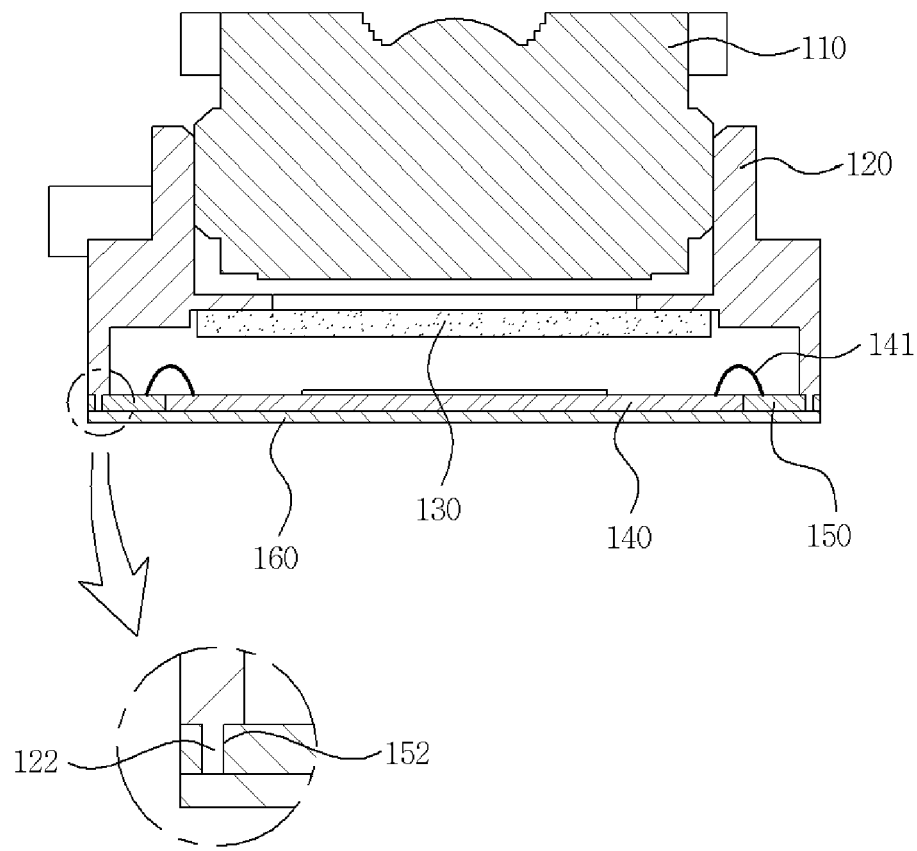
FIG. 4 is a cross-sectional view of the camera module according to the second embodiment of the invention.

FIGS. 3 and 4 schematically show a camera module according to a second embodiment of the invention. The camera module according to a second embodiment of the invention is similar to the camera module according to the first embodiment of the invention shown in FIGS. 1 and 2, except for a scheme of fixing the camera module. Therefore, in order to assist in clearly understanding the present disclosure, a description for components that are the same as or similar to the above-mentioned components will be omitted.

The camera module 100, according to the second embodiment of the invention, which has a small and slim size, secure reliability against drops, for example, and be provided in order to assist in position alignment between a housing and a plate, is configured to include a lens barrel part 110, a housing 120 having a guide pin 122, an infrared (IR)-cut filter 130, an image sensor 140, a circuit board 150, and a plate 160.

Particularly, in the camera module 100 according to a second exemplary embodiment of the present disclosure, the housing 120 is seated on the circuit board 150 and the plate 160 stacked so as to surface-contact each other, and the housing 120 includes one or more guide pins 122 protruding vertically downwardly along circumferences of a bottom surface thereof so as to be positioned at a regular position. Correspondingly, the circuit board 150 has one or more accommodating grooves 152 formed therein.

In the camera module 100, according to the second embodiment of the invention, one or more guide pins 122 provided on the bottom surface of the housing 120 are fitted into one or more accommodating grooves 152 to assist in positioning the housing 120. According to at least one embodiment, the guide pin 122 is extended at a length that is the same as or shorter than a depth of the accommodating groove 152. When the length of the guide pin 122 is longer than the depth of the accommodating groove 152, a clearance is formed between the bottom surface of the housing 120 and the circuit board 150. The clearance causes foreign materials, or the like, to be introduced into the camera module, thereby causing general deterioration of photographing performance of the camera module.

In addition, the accommodating groove 152 is perforated in a thickness direction of the circuit board 150 as shown, such that a portion of the plate 160 directly contacts the guide pin 122 through the accommodating groove 152.

At the time of performing assembling, in at least one embodiment, portions of the housing 120 and the circuit board 150 surface-contacting each other are applied with an adhesive, for example, a thermosetting adhesive in order to ensure a certain coupling state with the circuit board 150. As a result, the adhesive is introduced into internal spaces of the accommodating grooves 152 to couple the guide pins 122 of the housing 120 to the accommodating grooves 152 and the plate 160 to each other by bonding.

Figure 5:
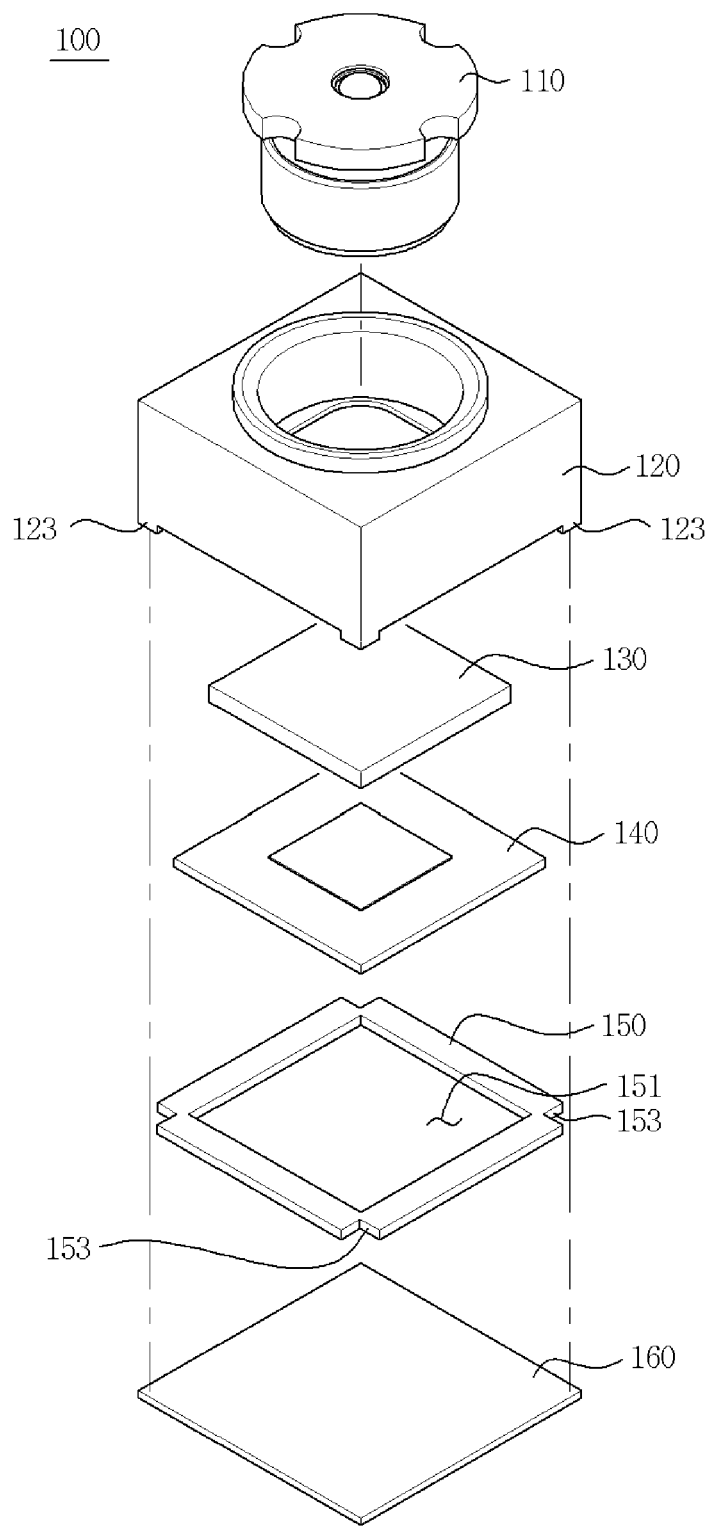
FIG. 5 is an exploded perspective view of a camera module according to a third embodiment of the invention.
Figure 6:
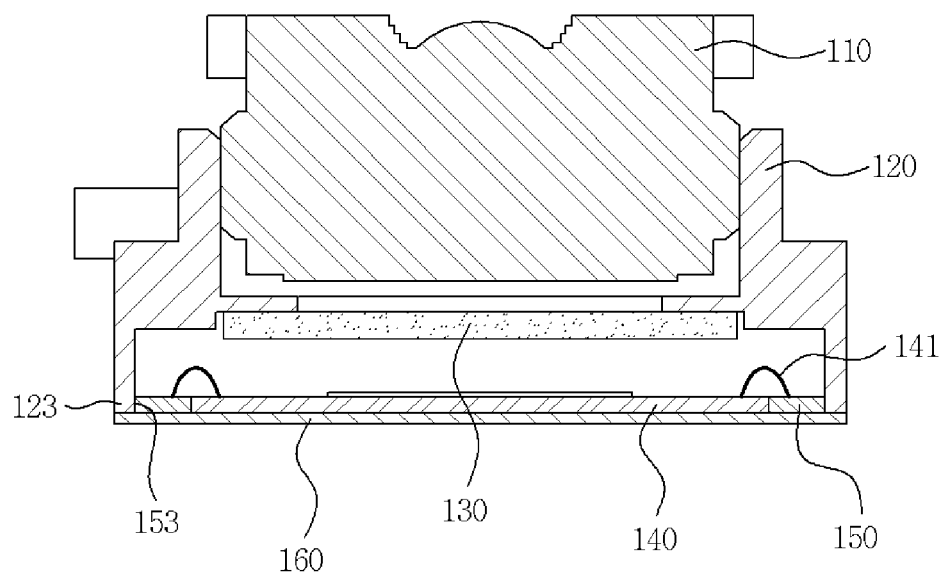
FIG. 6 is a cross-sectional view of the camera module according to the third embodiment of the invention.

FIGS. 5 and 6 schematically show a camera module according to a third embodiment of the invention. The camera module according to a third embodiment of the invention is similar to the camera module according to the first embodiment of the invention shown in FIGS. 1 and 2 except for a scheme of fixing the camera module. Therefore, in order to assist in clearly understanding the present disclosure, a description for components that are the same as or similar to the above-mentioned components will be omitted.

The camera module 100 according to a third embodiment of the invention has a structure in which reliability in assembling the camera module is improved.

In detail, a housing 120 includes one or more foot parts 123 extended vertically downwardly along edge circumferences of a bottom surface thereof. The circuit board 150 has one or more notches 153 formed at edge circumferences thereof, wherein the notches 153 have positions and shapes corresponding to those of the foot parts 123 so as to accommodate the foot parts 123 therein. A length of the foot part 123 is no longer than a thickness of the circuit board 150, such that a clearance is not formed between the bottom surface of the housing 120 and the circuit board 150.

As shown, the third embodiment of the invention is characterized in that portions of the housing 120, for example, the foot parts 123 direct contact the plate 160. In addition, the bottom surface of the housing 120 except for the foot parts 123 is seated on the circuit board 150 so as to contact the circuit board 150. This improves a contact area of the housing 120 to ensure certain fixing coupling between the housing and the circuit board and the plate.

In addition, in the third embodiment of the invention, the foot parts 123 of the housing 120 are fitted into the notches 153 of the circuit board 150 to assist in position alignment of the housing 120 on the circuit board 150.

At the time of performing assembling, in at least one embodiment, the bottom surface of the hosing 120 is applied with an adhesive, for example, a thermosetting adhesive in order to ensure a certain coupling state with the circuit board 150. This allows the circuit board 150, circumferential surfaces of the notches 153, and the plate 160 contacting the bottom surface of the housing 120 to be coupled to each other by bonding. Since the plate 160 may be certainly fixed through the foot parts 123 of the housing 120, a good contact state between the plate 160 and the circuit board 150 is ensured, such that the plate rapidly radiates heat generated from the circuit board to the outside and support the circuit board at a lower portion of the circuit board to complement strength of the circuit board.

Referring to FIGS. 5 and 6, the foot parts 123 are disposed at corners of the housing 120, respectively, and the notches 153 are also formed so as to correspond to the foot parts by chamfering corners of the circuit board 150. In the third embodiment of the invention, the foot parts are limited to being disposed at the corners, but is formed at any edge circumferences.

Figure 7:
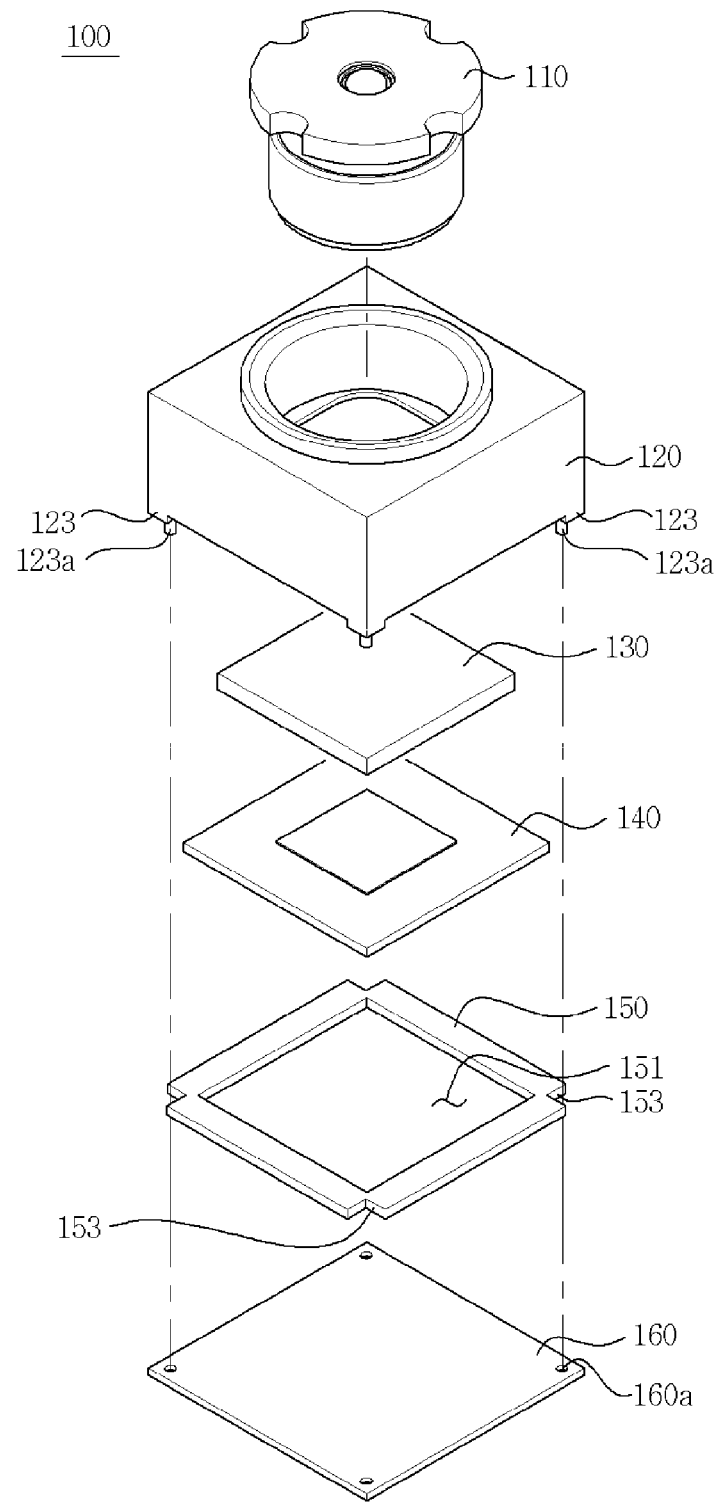
FIG. 7 is an exploded perspective view of a camera module according to a fourth embodiment of the invention.
Figure 8:
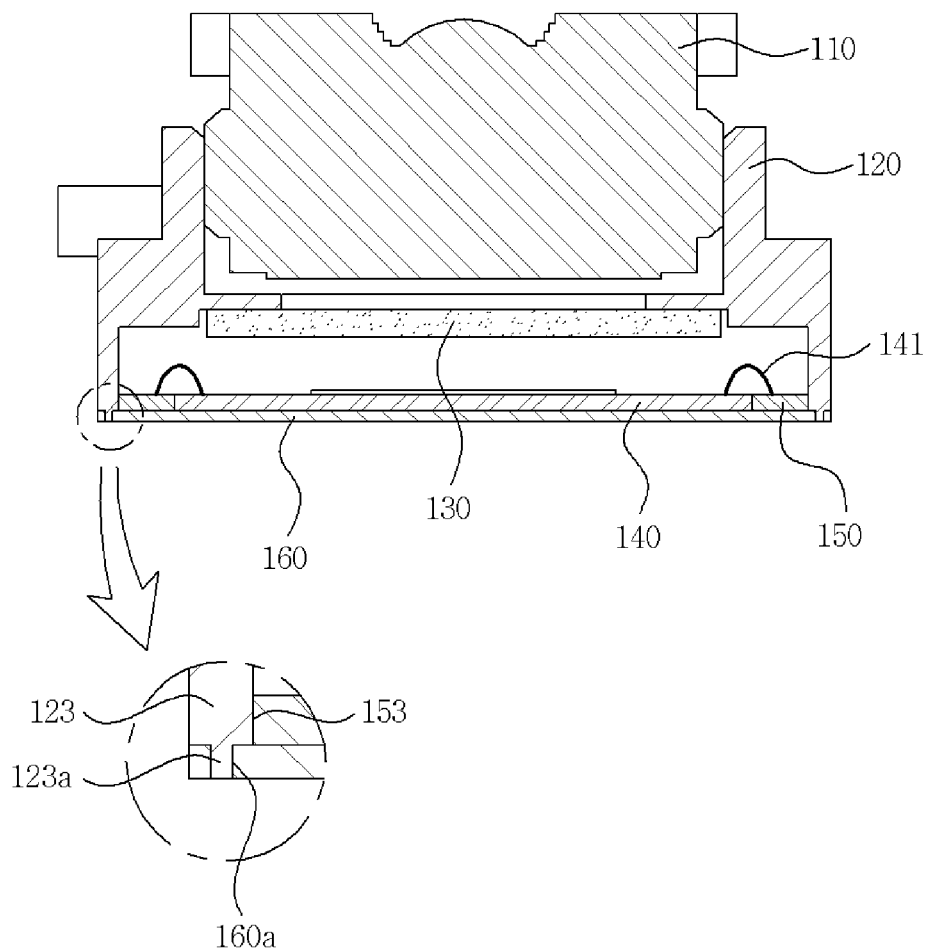
FIG. 8 is a cross-sectional view of the camera module according to the fourth embodiment of the invention.

FIGS. 7 and 8, which schematically show a camera module according to a fourth embodiment of the invention, show a modified example of the camera module according to the third embodiment of the invention.

In the camera module 100, according to the fourth embodiment of the invention, as shown, a coupling relationship between the housing 120 and the plate 160 is improved to improve reliability in assembling the camera module and assist in position alignment between the housing and the plate.

In detail, the housing 120 includes one or more foot parts 123 extended vertically downwardly along edge circumferences of a bottom surface thereof, and the foot parts 123 include guide pins 123a vertically downwardly protruding on lower surfaces thereof. The circuit board 150 has one or more notches 153 formed at edge circumferences thereof, wherein the notches 153 allows the foot parts 123 to contact an upper surface of the plate 160. The notches 153 have positions and shapes corresponding to those of the foot parts 123 so as to accommodate the foot parts 123 therein.

According to the fourth embodiment of the invention, the plate 160 has accommodating grooves 160a formed along edge circumferences thereof, wherein the accommodating grooves 160a have positions and shapes corresponding to the guide pins 123a of the foot parts 123 so as to accommodate the guide pins 123a therein. Preferably, the guide pin 123a is extended at a length that is the same as or shorter than a depth of the accommodating groove 160a.

In the camera module 100, according to the fourth embodiment of the invention, the foot parts 123 provided on the bottom surface of the housing 120 are disposed so as to be engaged with the notches 153 of the circuit board 150 and the guide pins 123a of the foot parts 123 are fitted into one or more accommodating grooves 160a, thereby making it possible to position the housing 120 and the plate 160 and certainly mount the circuit board 150 interposed between the housing 120 and the plate 160.

This disposition allows portions of the housing 120, for example, the foot parts 123 and the guide pins 123a to directly contact the accommodating grooves 160a of the plate 160 and adjacent regions to the accommodating grooves.

Figure 9:
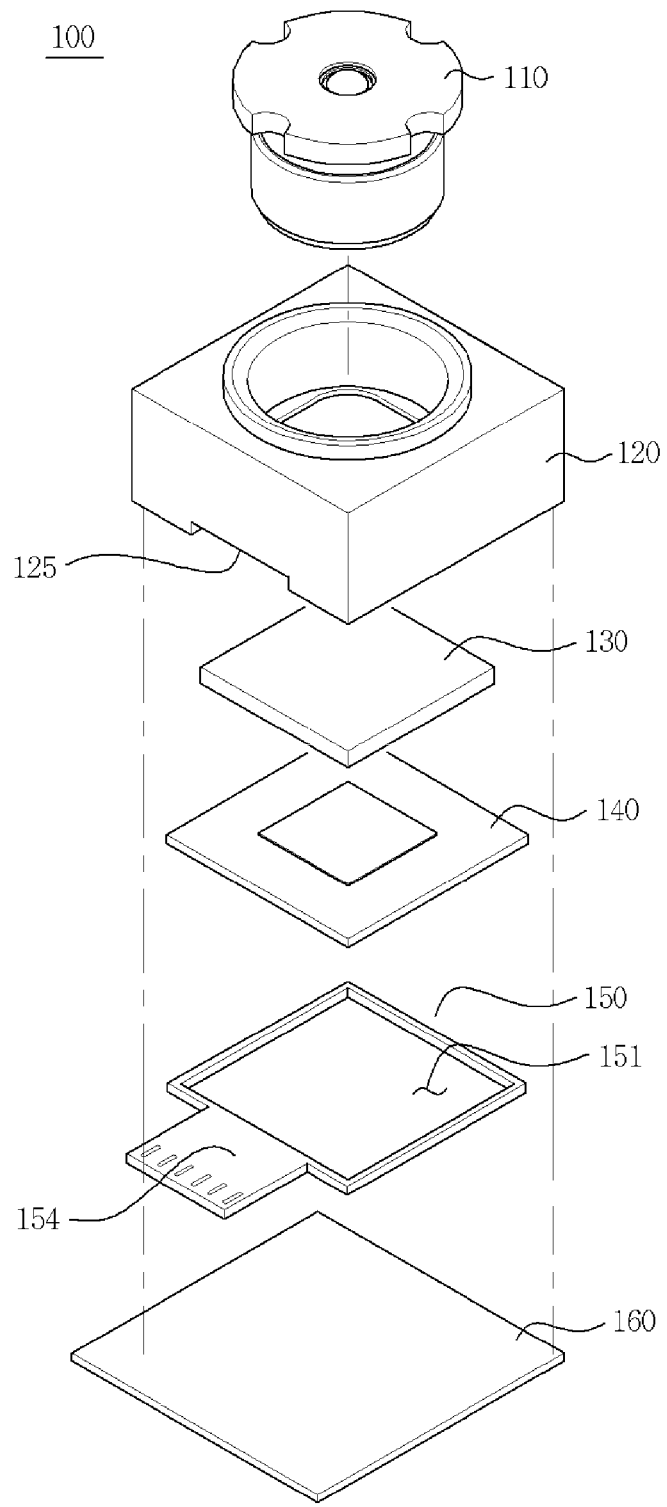
FIG. 9 is an exploded perspective view of a camera module according to a fifth embodiment of the invention.
Figure 10:
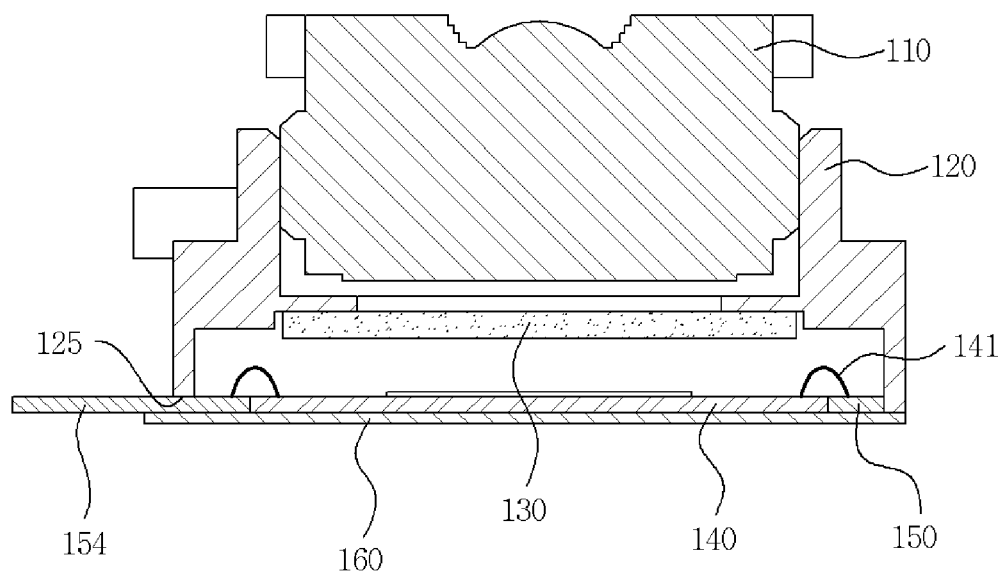
FIG. 10 is a cross-sectional view of the camera module according to the fifth embodiment of the invention.

FIGS. 9 and 10 schematically show a camera module according to a fifth embodiment of the invention.

As shown, in the camera module 100, according to the fifth embodiment of the invention, a bottom surface of the housing 120 and edge circumferences of the plate 160 are coupled to each other in a state in which they directly contact each other.

According to the fifth embodiment of the invention, the housing 120 has a concave shaped part 125 formed in the bottom surface of one side thereof. The bottom surface of the housing 120, except for the concave shaped part 125, is seated on and fixed to edges of the plate 160 by a coupling means such as an adhesive, as a non-limiting example. In the camera module 100 according to the fifth embodiment of the invention, an extension part 154 of the circuit board 150 is to the outside of the camera module 100 by means of the concave shaped part 125 disposed on an interface surface between the housing 120 and the plate 160. The extension part 154 of the circuit board 150 is withdrawn to the outside of the camera module to be coupled to a connector, or the like, so as to be in electrical communication with the connector. The concave shaped part 125 is formed so as to correspond to the extension part 154 of the circuit board 150 to ensure that the circuit board 150 is smoothly withdrawn.

In the camera module 100, according to the fifth embodiment of the invention, an internal space defined by the bottom surface of the housing 120 has a size at which the circuit board 150 is inserted thereinto to allow the circuit board 150 mounted on an upper surface of the plate 160 to be accommodated in the internal space of the housing 120 at the time of coupling the housing 120 and the plate 160 to each other. Thus, according to the fifth embodiment of the invention, it is preferable that the plate 160 has an area larger than that of the bottom surface of the housing so as to be coupled to the housing 120 while certainly supporting the bottom surface of the housing 120.

As set forth above, in the camera module according to various embodiments of the invention, the window is formed at the center of the circuit board, the image sensor is mounted in the window, the height of the camera module is reduced by the thickness of the circuit board, and the plate is mounted on the lower portion of the circuit board in order to complement the strength of the circuit board 150.

Through the above-mentioned structure, the plate is mounted on the lower portion of the circuit board and is robust to drops, impacts, for example, thereby reducing a thickness of the camera module simultaneously with securing the reliability of the camera module. Therefore, it is possible to miniaturize the camera module.

In addition, the plate is made of a thermal conductive material, thereby making it possible to excellently radiate heat generated when the circuit board mounted on the upper portion of the plate transceives the electrical signals.

The plate is mounted on the lower portion of the camera module to treat electromagnetic interface (EMI), thereby making it possible to increase reliability of the camera module.

In addition, the image sensor and the circuit board are connected to each other by the wire bonding part. Since upper portions of the image sensor and the circuit board have the same height, the wire bonding part has a length reduced as compared to the conventional art.

Therefore, a raw material cost is reduced as compared to the conventional art. In addition, the wire bonding part is connected laterally, such that a space may be usefully used as compared to the conventional art.

Terms used herein are provided to explain embodiments, not limiting the present invention. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device.

Embodiments of the present invention may suitably comprise, consist or consist essentially of the elements disclosed and may be practiced in the absence of an element not disclosed. For example, it can be recognized by those skilled in the art that certain steps can be combined into a single step.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe the best method he or she knows for carrying out the invention.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

As used herein, the terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "according to an embodiment" herein do not necessarily all refer to the same embodiment.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

What is claimed is:

1. A camera module comprising:
   a lens barrel part in which a plurality of lenses are stacked;
   a housing having the lens barrel part disposed therein;
   an infrared (IR)-cut filter provided in the housing and disposed at a lower portion of the lens barrel part;
   a circuit board having a window formed therein so as to penetrate through a central region thereof;
   an image sensor accommodated in the window of the circuit board and converting an external image into an electrical signal; and
   a plate coupled to a lower portion of the circuit board to radiate heat generated from the circuit board,
   wherein the housing comprises one or more foot parts extended vertically downwardly at edge circumferences of a bottom surface of the housing and a guide pin vertically downwardly protruding on a lower surface of each foot part,
   wherein the circuit board comprises one or more notches formed at positions corresponding to those of the foot parts of the housing, and
   wherein the plate comprises one or more accommodating grooves formed in an upper surface thereof facing the foot parts of the housing.

2. The camera module of claim 1, wherein the circuit board has a thickness corresponding to that of the image sensor.

3. The camera module of claim 1, further comprising a wire bonding part electrically connecting the image sensor and the circuit board to each other.

4. The camera module of claim 1, wherein the plate has a thickness thinner than that of the circuit board.

5. The camera module of claim 1, wherein the plate is made of a steel or copper material.

6. The camera module of claim 1, wherein the plate is made of a thermal conductive material.

7. The camera module of claim 1, wherein an upper surface of the circuit board is disposed on the same plane as an upper surface of the image sensor.

8. The camera module of claim 1, wherein the notches are formed at edge circumferences of the circuit board.

9. The camera module of claim 1, wherein the foot parts of the housing directly contact the plate.

10. The camera module of claim 1, wherein the foot parts are formed at corners of the housing, and
the notches are formed at corners of the circuit board.

11. The camera module of claim 1, wherein the foot part have a length part that is the same as or shorter than a thickness of the circuit board.

12. The camera module of claim 1, wherein the guide pin has a length part that is the same as or shorter than a depth of the accommodating groove.

13. The camera module of claim 1, wherein the accommodating grooves are formed by perforating the plate in a thickness direction.

14. The camera module of claim 1, wherein the housing has a concave shaped part formed in a bottom surface of one side thereof.

15. The camera module of claim 14, wherein the bottom surface of the housing except for the concave shaped part directly contacts the plate.

16. The camera module of claim 15, wherein the plate is formed so as to have an area larger than that of the bottom surface of the housing.

17. A camera module comprising:
a lens barrel part in which a plurality of lenses are stacked;
a housing having the lens barrel part disposed therein;
an IR-cut filter provided in the housing and disposed at a lower portion of the lens barrel part;
a circuit board having a window formed therein so as to penetrate through a central region thereof and disposed at a lower portion of the housing;
an image sensor accommodated in the window of the circuit board and converting an external image into an electrical signal; and
a plate disposed on a lower portion of the circuit board and directly contacting a portion of a bottom surface of the housing,
wherein the housing comprises one or more foot parts extended vertically downwardly at edge circumferences of a bottom surface of the housing and a guide pin vertically downwardly protruding on a lower surface of each foot part,
wherein the circuit board comprises on or more notches, formed at positions corresponding to those of the foot part of the housing, and
wherein the plate comprises one or more accommodating grooves formed in an upper surface thereof facing the foot parts of the housing.

18. The camera module of claim 17, wherein the plate supports the image sensor disposed in the window of the circuit board.

19. The camera module of claim 17, wherein an upper surface of the circuit board is disposed on the same plane as an upper surface of the image sensor.

* * * * *